(12) United States Patent
Ariizumi et al.

(10) Patent No.: US 10,006,414 B2
(45) Date of Patent: Jun. 26, 2018

(54) CONDENSATE STORAGE AND REMOVAL IN LOW PRESSURE EXHAUST GAS RECIRCULATION SYSTEM

(71) Applicants: Yoshiki Ariizumi, Nisshin (JP); Yusuke Aoyagi, Numazu (JP)

(72) Inventors: Yoshiki Ariizumi, Nisshin (JP); Yusuke Aoyagi, Numazu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 302 days.

(21) Appl. No.: 14/392,136

(22) PCT Filed: Jun. 26, 2013

(86) PCT No.: PCT/JP2013/067477
§ 371 (c)(1),
(2) Date: Dec. 23, 2015

(87) PCT Pub. No.: WO2014/207831
PCT Pub. Date: Dec. 31, 2014

(65) Prior Publication Data
US 2016/0186701 A1    Jun. 30, 2016

(51) Int. Cl.
*F02M 26/06* (2016.01)
*F02M 26/35* (2016.01)
(Continued)

(52) U.S. Cl.
CPC ............ *F02M 26/06* (2016.02); *F02B 37/00* (2013.01); *F02B 37/16* (2013.01); *F02B 39/16* (2013.01);
(Continued)

(58) Field of Classification Search
CPC ........ F02M 26/06; F02M 26/09; F02M 26/17; F02M 26/34; F02M 26/35; F02B 37/00; F02B 37/16
See application file for complete search history.

(56) References Cited

U.S. PATENT DOCUMENTS

| 8,056,338 B2 * | 11/2011 | Joergl | F02B 37/00 123/568.11 |
| 2009/0071150 A1 * | 3/2009 | Joergl | F02M 26/06 60/605.2 |
| 2016/0069302 A1 * | 3/2016 | Tabata | F02B 37/00 415/115 |

FOREIGN PATENT DOCUMENTS

| JP | 2009-174444 | 8/2009 |
| JP | 2009-264339 | 11/2009 |

(Continued)

*Primary Examiner* — Mary A Davis
(74) *Attorney, Agent, or Firm* — Finnegan, Henderson, Farabow, Garrett & Dunner LLP

(57) ABSTRACT

In accordance with the present invention, condensed water generated upstream of a compressor can be caused to flow into a groove 44, and temporarily accumulated therein. The condensed water flowing into the groove 44 moves to a lower portion in a gravity direction (that is, to an ABV 38-side) in the groove 44. When the ABV 38 is opened, the condensed water accumulated in the groove 44 is blown away to a center portion of an inlet 46 on a flow of a return gas, and, together with an intake gas flowing through the center portion, the condensed water flows into a compressor 20 from a center portion 42*b* of a front end surface of an impeller 42. Since the center portion 42*b* has a lower circumferential speed than that of an outer peripheral portion 42*a*, occurrence of erosion by contact with the condensed water can be suppressed as compared to the outer peripheral portion 42*a*.

4 Claims, 7 Drawing Sheets

(51) Int. Cl.
  *F02M 26/09* (2016.01)
  *F02B 37/16* (2006.01)
  *F02B 39/16* (2006.01)
  *F02B 37/00* (2006.01)
  *F02M 26/17* (2016.01)

(52) U.S. Cl.
  CPC ............ *F02M 26/09* (2016.02); *F02M 26/17* (2016.02); *F02M 26/35* (2016.02); *Y02T 10/144* (2013.01)

(56) References Cited

FOREIGN PATENT DOCUMENTS

| | | | | | |
|---|---|---|---|---|---|
| JP | 2013147988 | A | * | 8/2013 | |
| JP | 2014231821 | A | * | 12/2014 | |
| JP | 2015121106 | A | * | 7/2015 | ............ F02M 26/35 |
| JP | 2015137590 | A | * | 7/2015 | ............ F02M 26/06 |

* cited by examiner

PRIOR ART

FIG. 7
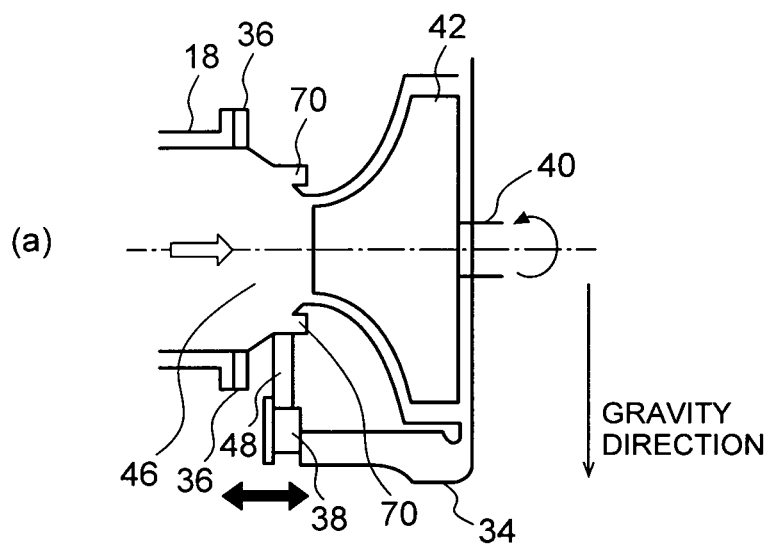
(a)
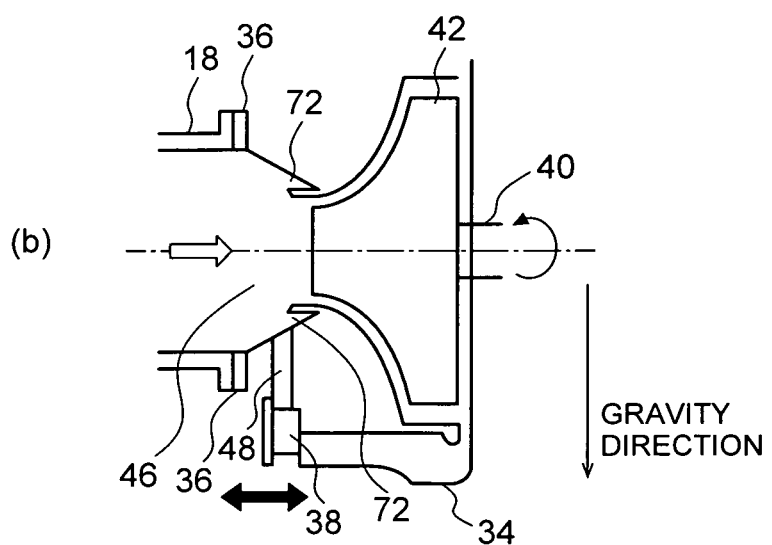
(b)

CONDENSATE STORAGE AND REMOVAL IN LOW PRESSURE EXHAUST GAS RECIRCULATION SYSTEM

CROSS-REFERENCE TO RELATED APPLICATIONS

This application is a national phase application of International Application No. PCT/JP2013/067477, filed Jun. 26, 2013, the content of which is incorporated herein by reference.

TECHNICAL FIELD

The present invention relates to an exhaust gas recirculation system for an internal combustion engine. More particularly, the present invention relates to an exhaust gas recirculation (EGR) system that is applied to a supercharged internal combustion engine.

BACKGROUND ART

Conventionally, application of an EGR system to a supercharged internal combustion engine is known as disclosed in, for example, Patent Literature 1. The EGR system constitutes a low pressure (LP) circuit EGR system. The LP circuit EGR system recirculates a low-pressure exhaust gas to the internal combustion engine by connecting an exhaust passage on a downstream side of an exhaust turbine, and an intake passage on an upstream side of a compressor. In accordance with the LP circuit EGR system, an EGR gas can be introduced into an intake gas that has not been boosted yet, a large amount of EGR gas can be recirculated to the internal combustion engine.

On the other hand, the LP circuit EGR system has a problem that the EGR gas is cooled to generate condensed water when the EGR gas joins the intake gas. When the condensed water is generated, erosion is caused to occur in an impeller of the compressor. In this regard, the EGR system of Patent Literature 1 includes an EGR heater that heats the EGR gas to a predetermined temperature in an EGR passage. When the EGR heater is operated, a temperature of the EGR gas can be increased before the EGR gas joins the intake gas. Therefore, the occurrence of the erosion can be suppressed by reducing an amount of the condensed water on the upstream side of the compressor.

Patent Literature 1: Japanese Patent Application Publication No. 2009-174444

However, the above EGR heater is for heating only, and when the EGR heater is installed, problems of a cost increase and ensuring of a space are unavoidable. Also, since a pressure loss in the above EGR heater is increased, an advantage of the LP circuit EGR system that the large amount of EGR gas can be recirculated to the internal combustion engine is possibly impaired.

The present invention has been made in view of the above problems. That is, an object is to provide an exhaust gas recirculation system for an internal combustion engine that can suppress occurrence of erosion in a compressor impeller by using an existing system.

SUMMARY OF THE INVENTION

In order to achieve the above object, a first invention is an exhaust gas recirculation system for an internal combustion engine, the exhaust gas recirculation system including:

an exhaust gas recirculation passage that connects an intake passage and an exhaust passage of the internal combustion engine;

a compressor that is provided downstream of a connection portion of the intake passage with the exhaust gas recirculation passage, and accommodates an impeller;

a storage portion that is formed in an inner wall of the intake passage between the connection portion and the impeller, and stores condensed water generated upstream of the compressor; and a bypass passage that communicates with the storage portion, and bypasses the impeller to return an intake gas from a downstream side to an upstream side of the impeller.

Also, in a second invention according to the first invention, a connection portion of the bypass passage with the storage portion is provided below the center of a rotating shaft of the impeller. The "below the center of a rotating shaft of the impeller" means a position lower than the center of the rotating shaft of the impeller. The "below the center of a rotating shaft of the impeller" includes not only a region immediately below (vertically below) the center of the rotating shaft of the impeller, but also a region on a lower side of the center of the rotating shaft and on an outer side of the region.

Also, in a third invention according to the first or second invention, the storage portion is formed within the compressor.

Also, in a fourth invention according to any one of the first to third inventions, the storage portion is an annular groove that is formed so as to surround the intake passage.

When the condensed water generated upstream of the compressor comes into contact with an outer peripheral portion of a front end surface of the impeller, erosion occurs in the outer peripheral portion. In this regard, in accordance with the first invention, the condensed water can be accumulated in the storage portion. The storage portion is formed in the inner wall of the intake passage between the connection portion of the intake passage with the exhaust gas recirculation passage and the impeller, and communicates with the bypass passage that bypasses the impeller to return the intake gas from the downstream side to the upstream side of the impeller. Therefore, the condensed water accumulated in the storage portion can be discharged, blown away to a center portion of the intake passage, and brought into contact with a center portion of the front end surface of the impeller by the intake gas returned to the upstream side from the downstream side of the impeller. Since the center portion has a lower circumferential speed than that of the outer peripheral portion at the front end surface of the impeller, the erosion by contact with the condensed water is difficult to occur in the center portion. Also, the bypass passage is generally provided in a supercharged internal combustion engine. Therefore, in accordance with the first invention, the occurrence of the erosion in the impeller of the compressor can be suppressed by using an existing system.

In accordance with the second invention, since the connection portion of the bypass passage with the storage portion is provided below the center of the rotating shaft of the impeller, the condensed water discharged from the storage portion can be blown away to the center portion of the intake passage.

In accordance with the third invention, since the storage portion is formed within the compressor, the condensed water can be accumulated directly upstream of the impeller. Also, since a moving distance in which the condensed water discharged from the storage portion reaches the impeller can be shortened, contact energy when the condensed water comes into contact with the impeller can be reduced. Therefore, the occurrence of the erosion in the impeller of the compressor can be further suppressed.

In accordance with the fourth invention, the condensed water generated upstream of the compressor can be accumulated in the annular groove formed so as to surround the intake passage.

BRIEF DESCRIPTION OF THE DRAWINGS

FIGS. 7(a) and 7(b) are views for explaining modifications of the embodiment.

MODES FOR CARRYING OUT THE INVENTION

Figure 1:
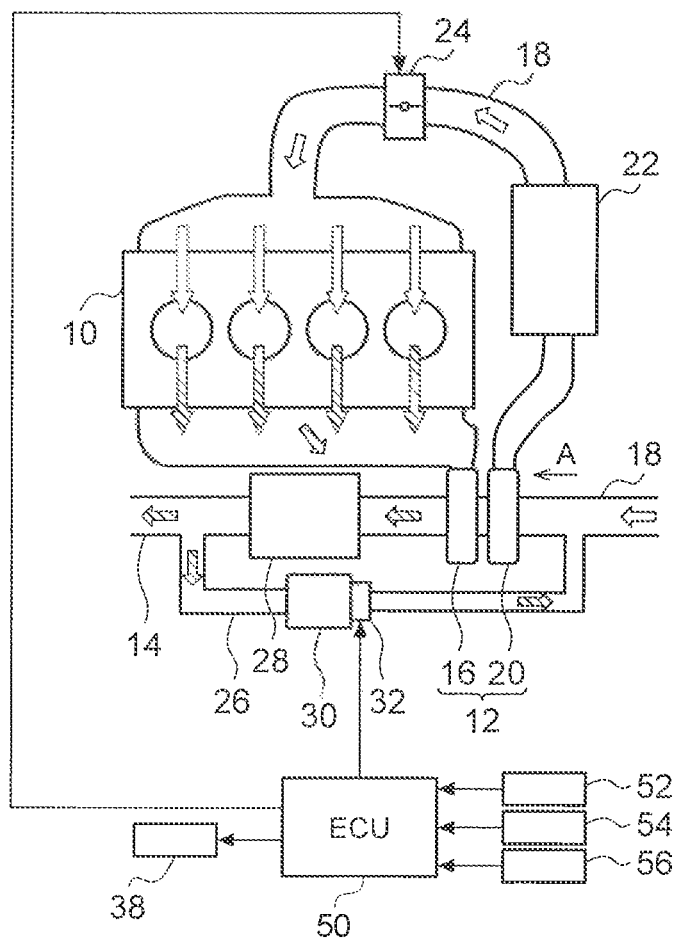
FIG. 1 is a view for explaining a configuration of an LP circuit EGR system of an embodiment.

Hereinafter, embodiments of the present invention will be described in detail by reference to the drawings. Note that common elements in the respective drawings are assigned the same reference numerals, and an overlapping description is omitted.

[Description of a System Configuration]

FIG. 1 is a view for explaining a configuration of an LP circuit EGR system of the present embodiment. As shown in FIG. 1, the LP circuit EGR system includes an engine 10 as an internal combustion engine that is mounted on a vehicle or the like. Each cylinder of the engine 10 is provided with a piston, an intake valve, an exhaust valve, a fuel injector, or the like. Although the engine 10 is shown as an inline-four engine in FIG. 1, the number of cylinders and a cylinder arrangement of the engine 10 are not limited thereto.

The LP circuit EGR system includes a supercharger 12. The supercharger 12 includes a turbine 16 that is provided in an exhaust passage 14, and a compressor 20 that is provided in an intake passage 18. The turbine 16 and the compressor 20 are connected to each other. When the supercharger 12 is operated, the turbine 16 rotates upon receiving an exhaust pressure, so that the compressor 20 is driven, and a gas flowing into the compressor 20 is compressed. The intake passage 18 is provided with an intercooler 22 that cools the compressed gas. A throttle valve 24 is provided downstream of the intercooler 22.

The LP circuit EGR system includes an EGR passage 26 through which an exhaust gas flowing through the exhaust passage 14 is introduced into the intake passage 18. The EGR passage 26 connects the exhaust passage 14 on a downstream side of an exhaust gas treatment device 28 and the intake passage 18 on an upstream side of the compressor 20. An EGR cooler 30 that cools the exhaust gas flowing through the EGR passage 26 (that is, an EGR gas) is provided midway in the EGR passage 26. An EGR valve 32 that controls a flow rate of the EGR gas to be introduced into the intake passage 18 is attached to the EGR cooler 30.

Figure 2:
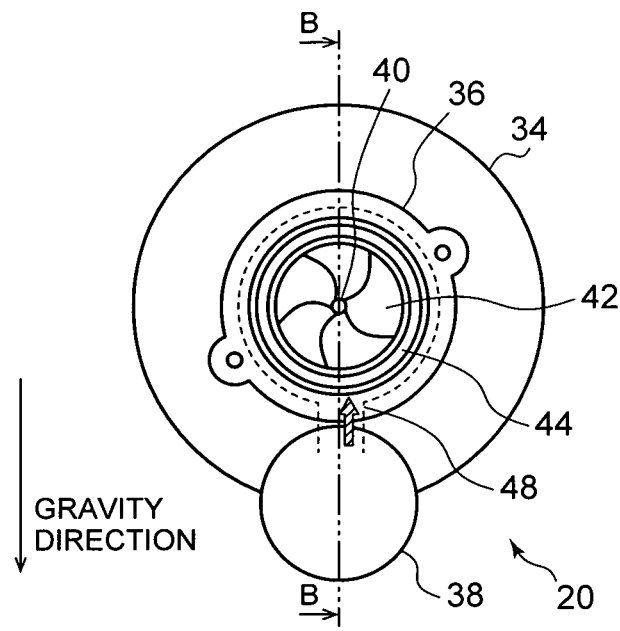
FIG. 2 is a schematic view on Arrow A in FIG. 1.

FIG. 2 is a schematic view on Arrow A in FIG. 1. As shown in FIG. 2, the compressor 20 includes a housing 34 that constitutes an outer shell of the compressor 20 and has a substantially circular shape in front view, a flange 36 that is provided in a center portion of the housing 34, and an air bypass valve (ABV) 38 that is provided in an outer peripheral portion of the housing 34. An impeller 42 that is installed so as to be rotatable about a shaft 40 is accommodated in the housing 34. The ABV 38 is a normally-closed solenoid valve, and is provided in a lower portion in a gravity direction (a vertical direction).

Figure 3:
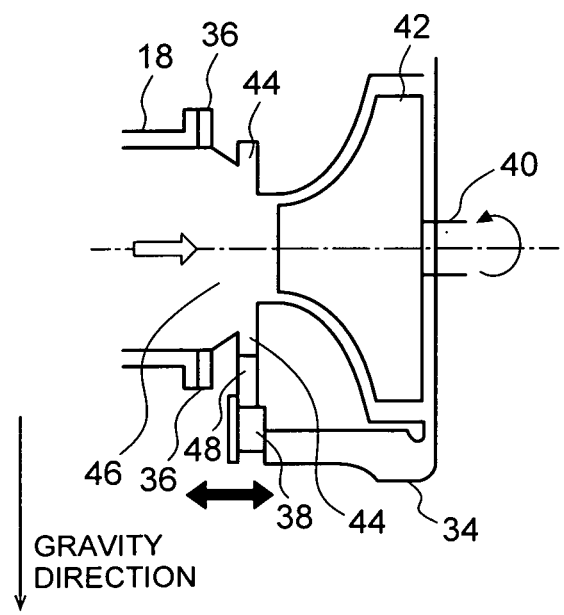
FIG. 3 is a schematic view on Arrow BB in FIG. 2.

An annular groove 44 is formed in the housing 34 between the flange 36 and the impeller 42. FIG. 3 is a schematic view on Arrow BB in FIG. 2. As shown in FIG. 3, the groove 44 is formed in an outer peripheral portion of an inlet 46 that guides a gas to a suction side of the impeller 42. A portion of the groove 44 communicates with an air outlet portion of an air bypass passage 48 that is partially closed by the ABV 38. An air inlet portion of the air bypass passage 48 communicates with a scroll (not shown) of the housing 34. That is, the air bypass passage is formed within the housing 34. By opening the ABV 38, the closing of the air bypass passage 48 is released, and the scroll and the air bypass passage 48 come into communication with each other. When the ABV 38 is opened during boosting, a compressed gas on a downstream side of the impeller 42 is returned to an upstream side of the impeller 42 due to a pressure difference between the upstream side and the downstream side of the impeller 42.

The system configuration continues to be described by referring back to FIG. 1. The LP circuit EGR system includes an ECU (Electronic Control Unit) 50 as a control device. An airflow meter 52 that detects a flow rate and a temperature of an intake gas (fresh air) flowing into the intake passage 18, a throttle position sensor 54 that detects an opening of the throttle valve 24, an EGR position sensor 56 that detects an opening of the EGR valve 32, and other various sensors necessary for controlling the engine 10 (for example, a temperature sensor that detects an engine cooling water temperature, and a crank angle sensor that detects an engine speed) are electrically connected to an input side of the ECU 50. On the other hand, the throttle valve 24, the EGR valve 32, the ABV 38, and other various actuators are electrically connected to an output side of the ECU 50. The ECU 50 executes predetermined programs based on input information from the various sensors described above to operate the various actuators or the like described above, and thereby executes erosion measure ABV operation control described below, and other various controls regarding an operation of the engine 10.

Feature of the Embodiment

Figure 4:
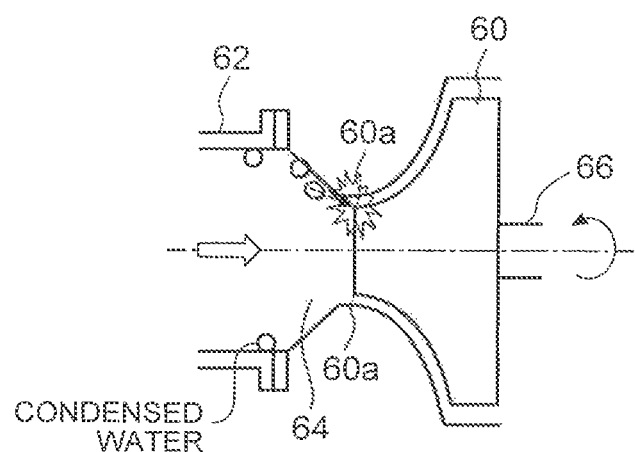
FIG. 4 is a view for explaining a problem in a conventional LP circuit EGR system.

FIG. 4 is a view for explaining a problem in a conventional LP circuit EGR system. As shown in FIG. 4, in the conventional system, condensed water may be generated in an intake passage 62 on an upstream side of an impeller 60. This is because water vapor in an EGR gas is cooled by an inner wall of the intake passage 62 or fresh air, and the condensed water is easily generated especially when an outside air temperature is low. The condensed water generated by contact with the fresh air flows through center portions of the intake passage 62 and an inlet 64, and flows into the impeller 60 from a center portion of the impeller 60

(that is, near a shaft 66). On the other hand, the condensed water generated by contact with the inner wall of the intake passage 62 or generated by contact with the fresh air and adhering to the inner wall moves along the inner wall. The condensed water moving along the inner wall moves to an inner wall of the inlet 64 while increasing its size, and comes into contact with an outer peripheral portion 60*a* of a front end surface of the impeller 60. Accordingly, erosion occurs in the outer peripheral portion 60*a*, resulting in a problem that boost efficiency is reduced.

In this regard, in accordance with the LP circuit EGR system of the present embodiment, condensed water moving along an inner wall of the intake passage 18 can be collected in the groove 44. Therefore, damage to an outer peripheral portion of a front end surface of the impeller 42 by contact with the condensed water can be prevented. However, since the groove 44 has a limited capacity, there remains a possibility that the condensed water overflows from the groove 44. When the condensed water is continuously accumulated in the groove 44 for a long time, an area around the groove 44 may be eroded. Thus, in the present embodiment, control is performed in which the condensed water is discharged from the groove 44 by operating the ABV 38 while the condensed water is being collected in the groove 44 (the erosion measure ABV operation control).

[The Erosion Measure ABV Operation Control]

The erosion measure ABV operation control is control for opening the ABV 38 when an operating condition of the ABV 38 and a condensed water generation condition are satisfied. The above operating condition is a normal operating condition of the ABV 38, and is satisfied when the throttle valve 24 is rapidly closed during high boosting. A reason why the ABV 38 is opened when the above operating condition is satisfied is because, when the throttle valve 24 is rapidly closed during high boosting, a pressure on the downstream side of the impeller 42 is increased, turbo rotation is slowed down, and engine torque is not outputted in next acceleration, so that the vehicle or the like cannot be driven as intended by a driver. Also, the above condensed water generation condition is a characteristic condition of the present embodiment, and is satisfied when the condensed water is generated on or adheres to the inner wall of the intake passage 18 on the upstream side of the impeller 42. By opening the ABV 38 when the above condensed water generation condition is satisfied, the scroll and the groove 44 can be brought into communication, and the condensed water collected in the groove 44 can be discharged.

Figure 5:
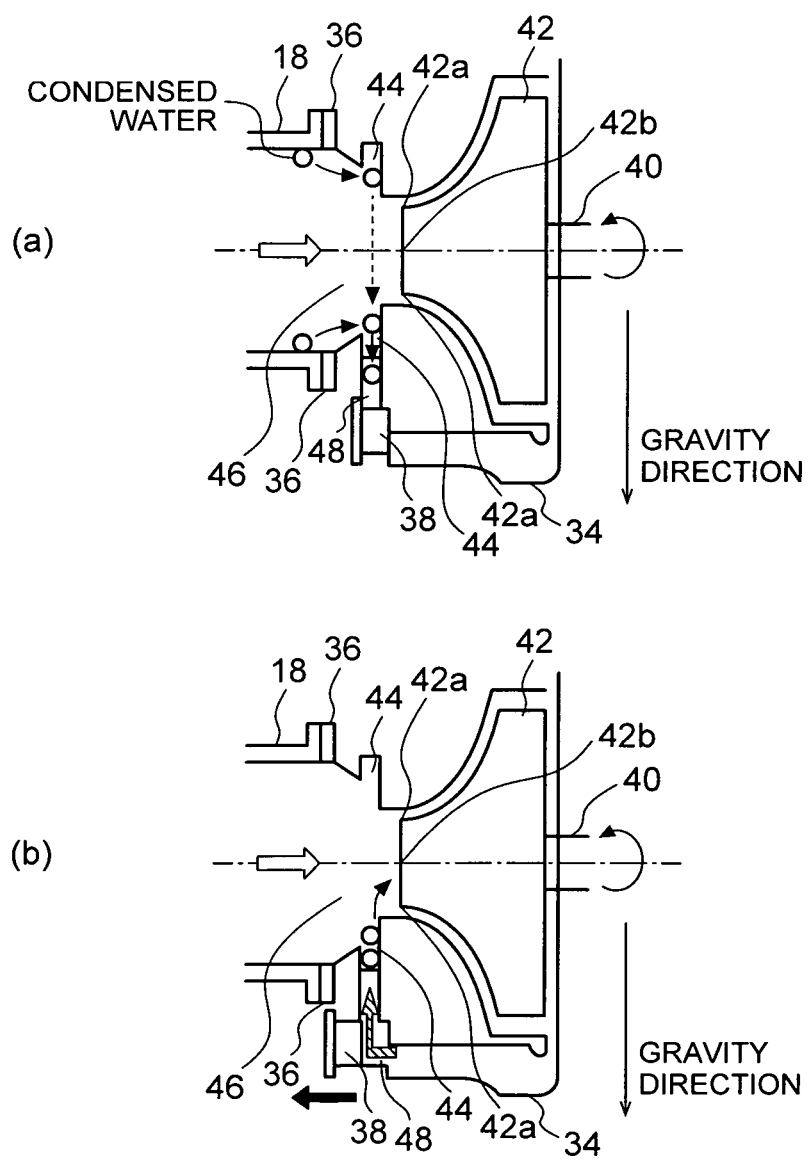
FIGS. 5(a) and 5(b) are views for explaining erosion measure ABV operation control.

FIGS. 5(*a*) and 5(*b*) are views for explaining the erosion measure ABV operation control. In the LP circuit EGR system of the present embodiment, the condensed water is sometimes generated on the inner wall of the intake passage 18 on the upstream side of the impeller 42 similarly to the conventional system described using FIG. 4. In this regard, in accordance with the present embodiment, the generated condensed water can be caused to flow into the groove 44, and can be temporarily accumulated therein (FIG. 5(*a*)). The condensed water flowing into the groove 44 moves to the lower portion in the gravity direction (that is, to the ABV 38-side) in the groove 44 (FIG. 5(*a*)).

When the erosion measure ABV operation control is executed, the condensed water accumulated in the groove 44 on the ABV 38-side is discharged (FIG. 5(*b*)). The condensed water accumulated in the groove 44 on the ABV 38-side is blown away to a center portion of the inlet 46 on a flow of the return gas directed from the downstream side to the upstream side of the impeller 42, and, together with the intake gas flowing through the center portion, the condensed water flows into the compressor 20 from a center portion 42*b* (that is, near the shaft 40) of the front end surface of the impeller 42 (FIG. 5(*b*)). Since the center portion 42*b* has a lower circumferential speed than that of an outer peripheral portion 42*a* at the front end surface of the impeller 42, the erosion by contact with the condensed water is difficult to occur as compared to the outer peripheral portion 42*a*. That is, the occurrence of the erosion in the impeller 42 can be suppressed.

[Specific Processing]

Figure 6:
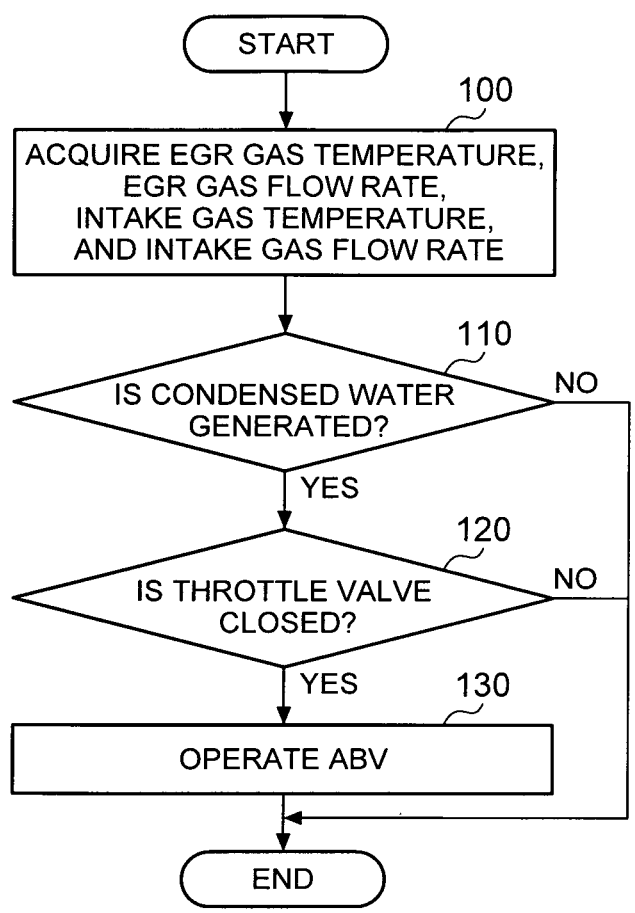
FIG. 6 is a flowchart illustrating a processing routine of the erosion measure ABV operation control executed by an ECU 50 in the embodiment.

FIG. 6 is a flowchart illustrating a processing routine of the erosion measure ABV operation control executed by the ECU 50 in the present embodiment. Note that the routine shown in FIG. 6 is repeatedly executed when a boost pressure reaches a set value or more.

In the routine shown in FIG. 6, first, the ECU 50 acquires a temperature and a flow rate of the EGR gas and a temperature and a flow rate of the intake gas (step 100). In this step, the temperature of the EGR gas is calculated by using a model or the like separately stored in the ECU 50. The flow rate of the EGR gas is calculated from a signal of the EGR position sensor 56. The temperature and the flow rate of the intake gas are calculated from a signal of the airflow meter 52.

Subsequently, the ECU 50 determines whether the above condensed water generation condition is satisfied by using the values acquired in step 100 (step 110). To be more specific, the ECU 50 first calculates a temperature of the inner wall of the intake passage 18 on the upstream side of the impeller 42, and calculates a dew point temperature of a mixture gas of the EGR gas and the intake gas by using the values acquired in step 100. When the inner wall temperature falls below the dew point temperature, it can be determined that the condensed water is generated on or adheres to the inner wall, so that the ECU 50 proceeds to step 120. On the other hand, when the inner wall temperature is equal to or more than the dew point temperature, it can be determined that the above condensed water generation condition is not satisfied, so that the ECU 50 terminates the routine.

In step 120, the ECU 50 determines whether the above operating condition is satisfied. To be more specific, the ECU 50 determines whether the above operating condition is satisfied by using a gradient of the throttle opening from a signal of the throttle position sensor 54. When an absolute value of the above gradient exceeds a predetermined reference value, it can be determined that the throttle valve 24 is rapidly closed, so that the ECU 50 proceeds to step 130, and operates the ABV 38. On the other hand, when the absolute value of the above gradient is equal to or less than the predetermined reference value, it can be determined that the above operating condition is not satisfied, so that the ECU 50 terminates the routine.

As described above, in accordance with the routine shown in FIG. 6, when the inner wall temperature of the intake passage 18 falls below the dew point temperature, and the absolute value of the gradient of the throttle opening exceeds the predetermined reference value, the ABV 38 can be operated. Therefore, the condensed water collected in the groove 44 on the ABV 38-side can be discharged by the return gas, brought into contact with the center portion 42*b*, and then caused to flow into the impeller 42. Thus, the occurrence of the erosion in the outer peripheral portion 42*a* of the impeller 42 can be suppressed.

Note that in the above embodiment, the EGR passage 26 corresponds to an "exhaust gas recirculation passage" of the above first invention, the compressor 20 a "compressor" of the same invention, the groove 44 a "storage portion" of the same invention, and the air bypass passage 48 a "bypass passage" of the same invention.

Also, the air outlet portion of the air bypass passage 48 corresponds to a "connection portion" of the above second invention.

By the way, although the groove 44 is formed in a direction perpendicular to a flow direction of the intake gas in the above embodiment, a formation direction of the groove 44 is not limited thereto, and various modifications may be made. FIGS. 7(a) and 7(b) are views for explaining modifications of the present embodiment. For example, a groove 70 may be formed in a direction parallel to the flow direction of the intake gas (FIG. 7(a)). Alternatively, a groove 72 may be formed along an inclination direction of the inlet 46 (FIG. 7(b)). Since the grooves 70, 72 can temporarily store the condensed water generated or the like on the inner wall of the intake passage 18, an effect similar to that of the above embodiment can be obtained.

Figure 8:
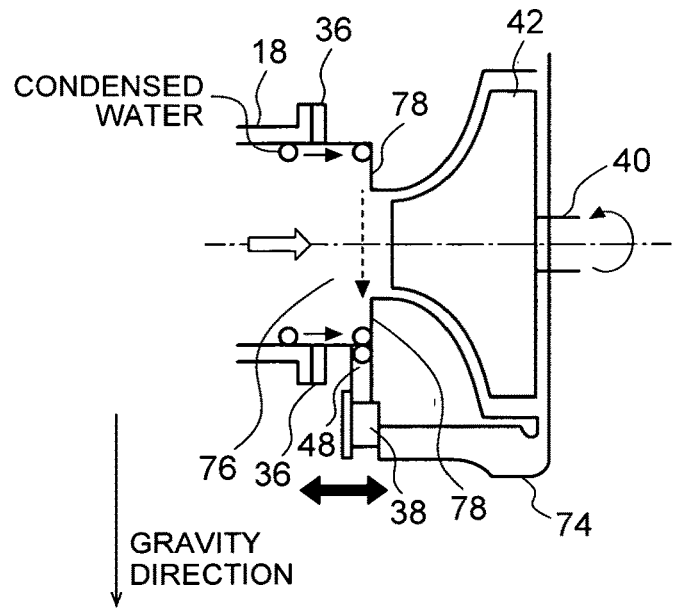
FIG. 8 is a view for explaining a modification of the embodiment.

Furthermore, a housing that can temporarily store the condensed water can produce the effect similar to that of the above embodiment. FIG. 8 is a view for explaining a modification of the present embodiment. In a housing 74 shown in FIG. 8, a diameter of an inlet 76 is substantially constant from the intake passage 18-side up to an inner wall 78, and is decreased on a downstream side with respect to the inner wall 78. The inner wall 78 forms a surface parallel to the front end surface of the impeller 42, and is formed so as to surround the outer peripheral portion of the front end surface. Therefore, as shown in FIG. 8, the condensed water moving along the inner wall of the intake passage 18 is blocked by the inner wall 78, and is temporarily stored in the lower portion in the gravity direction (that is, the air bypass passage 48-side). Thus, when a blocking portion as described above is formed in the housing, the effect similar to that of the above embodiment can be obtained.

Figure 9:
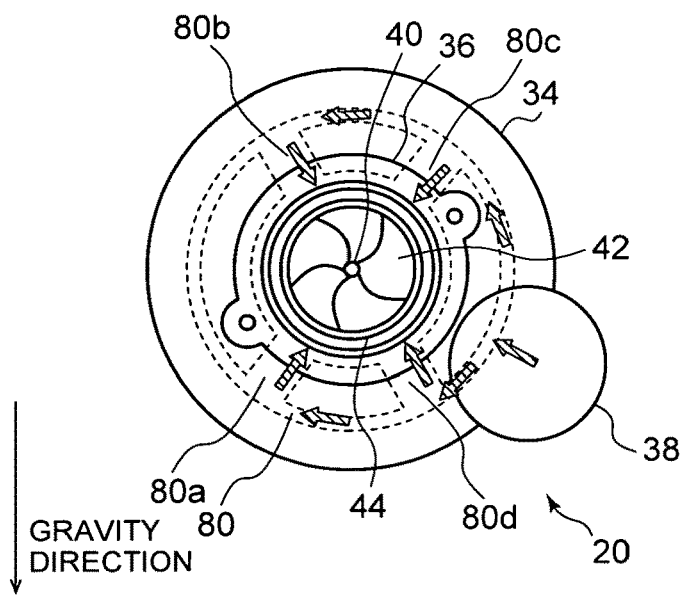
FIG. 9 is a view for explaining a modification of the embodiment.

Also, although the ABV 38 is provided in the lower portion in the gravity direction, and the air outlet portion of the air bypass passage 48 is connected to the groove 44 from the lower portion in the gravity direction in the above embodiment, a method of connecting the air outlet portion to the groove 44 and a position of the ABV 38 are not limited thereto, and various modifications may be made. FIG. 9 is a view for explaining a modification of the present embodiment. Even when an air outlet portion 80 having a plurality of return portions 80a to 80d is provided in an outer periphery of the groove 44 as shown in FIG. 9, the condensed water accumulated in the groove 44 can be discharged by the return gas, and caused to flow into the impeller 42 from the center portion of the impeller 42. Therefore, the effect similar to that of the above embodiment can be obtained.

Also, although the air bypass passage 48 and the groove 44 are formed within the housing 34 in the above embodiments, the air bypass passage 48 and the groove 44 may be formed outside of the housing 34. That is, the air bypass passage 48 and the groove 44 may be formed in the inner wall of the intake passage 18 between a gas outlet portion of the EGR passage 26 and the impeller 42.

10 Engine, 12 Supercharger, 14 Exhaust passage, 18, 62 Intake passage, 20 Compressor, 24 Throttle valve, 26 EGR passage, 34, 74 Housing, 38 Air bypass valve (ABV), 42, 60 Impeller, 44, 70, 72 Groove, 46, 64, 76 Inlet, 48 Air bypass passage, 50 ECU

The invention claimed is:

1. An exhaust gas recirculation system for an internal combustion engine, the exhaust gas recirculation system comprising:
   an exhaust gas recirculation passage that connects an intake passage and an exhaust passage of the internal combustion engine;
   a compressor provided downstream of a connection portion of the intake passage with the exhaust gas recirculation passage, and the compressor accommodating an impeller;
   a storage portion provided on an inner wall of the intake passage between the connection portion and the impeller, and the storage portion being configured to store condensed water generated upstream of the compressor; and
   a bypass passage that communicates with the storage portion, and the bypass passage bypasses the impeller to return an intake gas from a downstream side to an upstream side of the impeller.

2. The exhaust gas recirculation system for an according to claim 1,
   wherein a connection portion of the bypass passage with the storage portion is provided below a center of a rotating shaft of the impeller.

3. The exhaust gas recirculation system according to claim 1,
   wherein the storage portion is provided at the compressor.

4. The exhaust gas recirculation system according to claim 1,
   wherein the storage portion is an annular groove, and the storage portion surrounds the intake passage.

* * * * *